(12) United States Patent
Eisenhardt et al.

(10) Patent No.: US 6,577,482 B1
(45) Date of Patent: Jun. 10, 2003

(54) PROTECTIVE CIRCUIT FOR A SERIES CONNECTION OF A POWER SEMICONDUCTOR END STAGE AND AN INDUCTIVE CONSUMER

(75) Inventors: Harald Eisenhardt, Rutesheim (DE); Bernhard Rasch, Fellbach (DE); Rolf Falliano, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/830,731

(22) PCT Filed: Aug. 26, 2000

(86) PCT No.: PCT/DE00/02936

§ 371 (c)(1),
(2), (4) Date: Jul. 31, 2001

(87) PCT Pub. No.: WO01/17088

PCT Pub. Date: Mar. 8, 2001

(30) Foreign Application Priority Data

Sep. 1, 1999 (DE) .......................... 199 41 489

(51) Int. Cl.[7] .................................................. H02H 3/18
(52) U.S. Cl. .............................. 361/84; 361/82; 361/79
(58) Field of Search ..................... 361/84, 79, 86, 361/87, 82

(56) References Cited

U.S. PATENT DOCUMENTS 4,680,512 A * 7/1987 Melocik ..................... 318/139
4,748,532 A * 5/1988 Commander et al. ........ 323/289
5,546,268 A * 8/1996 Hurley et al. ................ 361/154
5,625,518 A   4/1997 Bober

FOREIGN PATENT DOCUMENTS

DE    197 32 094    1/1999

* cited by examiner

*Primary Examiner*—Shawn Riley
(74) *Attorney, Agent, or Firm*—Kenyon & Kenyon

(57) ABSTRACT

A protective circuit for a series circuit of a power semiconductor and an inductive load, to which a freewheeling circuit of a freewheeling diode and a reverse polarity protection semiconductor switch connected in series is connected in parallel. The power semiconductor output stage may be switched on and off depending on a predetermined setpoint value with a pulse-width modulated control signal and the reverse polarity protection semiconductor switch may be made non-conducting via a charging pump when the polarity of the supply voltage is reversed. The destruction of components in the case of non-functioning of the freewheeling circuit may be avoided by monitoring a point in the freewheeling circuit of a freewheeling diode and a reverse polarity protection semiconductor switch or in the series circuit of load and power semiconductor output stage for a voltage or a current which appears if the freewheeling circuit is non-functioning, and by initiating the shut-off of the control of the power semiconductor output stage with this fault indicating voltage or current.

10 Claims, 4 Drawing Sheets

PROTECTIVE CIRCUIT FOR A SERIES CONNECTION OF A POWER SEMI-CONDUCTOR END STAGE AND AN INDUCTIVE CONSUMER

FIELD OF THE INVENTION

The present invention relates to a protective circuit for a series circuit of a power semiconductor and an inductive load, to which a freewheeling circuit of a freewheeling diode and a reverse polarity protection semiconductor switch connected in series is connected in parallel, the power semiconductor output stage being switchable on and off depending on a predetermined setpoint value with a pulse-width modulated control signal, and the reverse polarity protection semiconductor switch can be made non-conducting via a charging pump when the polarity of the supply voltage is reversed.

BACKGROUND INFORMATION

The protective circuits referred to above (with defect-free components) may provide sufficient reverse polarity protection, that is, protection of the components against overloading and destruction in the case of supply voltage applied with reverse polarity. In order to obtain an effective reverse polarity protection, an additional power semiconductor switch may be connected to the freewheeling circuit. This additional semiconductor switch is controlled by the loading pump so that the semiconductor switch is conducting in the freewheeling circuit in normal operation, while it interrupts the current flow via the freewheeling diode through the non-conducting state in the case of reverse polarity supply voltage.

If irregularities which do not control the semiconductor switch in this way appear in the circuit, then uncontrolled over-voltages which result in the destruction of components appear in the circuit. This defect can result in fires, which, in particular in the case of the use of the circuit in a motor vehicle, can lead to vehicle fires.

SUMMARY OF THE INVENTION

An object of an exemplary embodiment of the present invention is to improve a protective switch of the type referred to so that defects of the loading pump or of the reversed polarity protection semiconductor switch, which may lead to the freewheeling circuit not functioning correctly, can be recognized and protective measures can be taken to protect the components of the circuit against destruction.

It is believed that the object may be achieved according to an exemplary embodiment of the present invention by the fact that a point in the freewheeling circuit of the freewheeling diode and the reverse polarity protection semiconductor switch or in the series circuit of load and power semiconductor output stage is monitored for a voltage or a current which appears (fails) in the case of non-functioning of the freewheeling circuit, and that the shut-off of the control of the power semiconductor output stage can be initiated with this voltage or this current failure.

Non-operation of the freewheeling circuit (that is, a voltage increase over a predetermined voltage or current failure) is recognized with this voltage or current monitoring, and the control of the power semiconductor output stage is switched off so that the critical components in the circuit are reliably protected against overloading. The power semiconductor output stage then is always non-conducting, that is high-resistance.

According to another exemplary embodiment, the control of the power semiconductor output stage takes place by the power semiconductor output stage being controllable via a PWM control, and by the increased voltage or current failure which appears in the case of a defect switching off the PWM control in the freewheeling circuit.

In order to obtain absolute protection against destruction of components, it is believed that switching off the PWM control at a predetermined time equal to or less than 10 ms after the appearance of the defect may be advantageous.

If a buffer capacitor is connected at the connecting point between the freewheeling diode and the reverse polarity semiconductor circuit in order to largely eliminate feedback effects of the timed operation of the load on the supply voltage, the voltage across the buffer capacitor is monitored for a rise over a predetermined value. The increased voltage across the buffer capacitor is transferred as a shut-off signal to the PWM control. In this case, in order to simplify the shutoff of the PWM control, the increased voltage across the buffer capacitor can be transferred to the PWM control as a digital shut-off signal via an analog-digital converter.

The transfer of the shut-off signal from the buffer capacitor also can be performed according to another exemplary embodiment so that the voltage across the buffer capacitor is reduced via a voltage divider and can be transferred to the analog-to-digital converter smoothed again.

A specific response threshold in the monitoring circuit is achieved according to another exemplary embodiment by comparing the voltage across the buffer capacitor or the reduced voltage in a comparator with a predetermined reference voltage, and the comparator routes a digital shut-off signal to the PWM control when the voltage across the buffer capacitor or the reduced voltage exceeds the reference voltage.

The PWM control may then be "safely" shut off when the refinement is made so that the comparator is provided with an automatic circuit breaker, which maintains the shut-off state and the stable shut-off state of the comparator be canceled by a reset signal which can be supplied to the comparator from the PWM control. The reset signal switches the circuit back for operation after elimination of the defect.

A voltage monitoring may also be achieved by monitoring the drain-ground voltage of the power semiconductor output stage in a low side circuit, by having the drain-ground voltage in a comparator comparable with a predetermined reference voltage, by having the comparator supply a digital shut-off signal to the PWM control when the drain-ground voltage exceeds the reference voltage, and by interrupting the control of the power semiconductor output stage with the shut-off signal and by the reference voltage for the comparator being switched to become inactive. With this protective circuit, the power semiconductor output stage is incorporated in the protection circuit.

A voltage monitoring takes place since the freewheeling circuit is monitored for failure of the timed freewheeling current.

DETAILED DESCRIPTION

Figure 1:
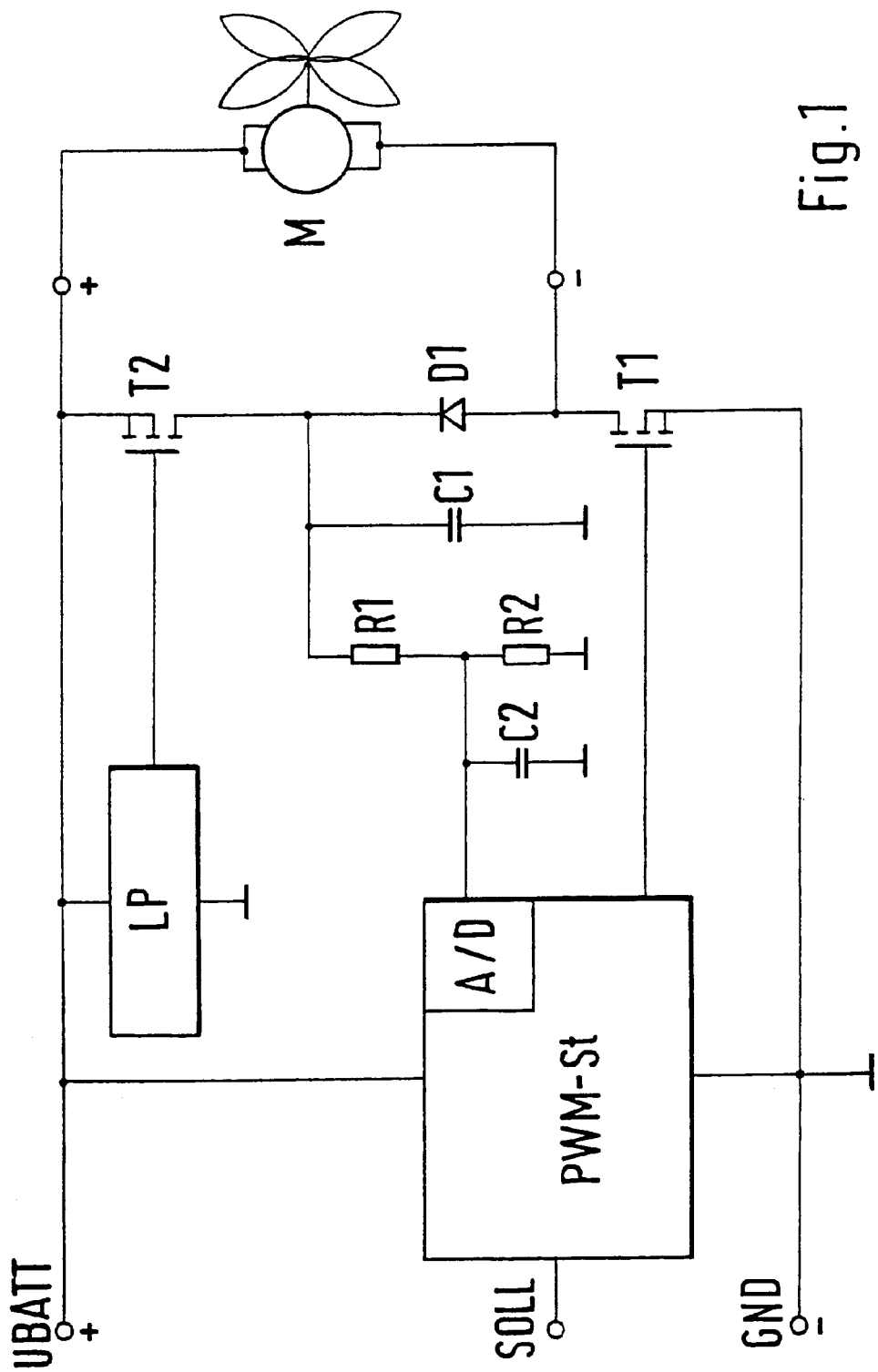
FIG. 1 shows a protective circuit with an arrangement for monitoring the voltage across the buffer capacitor and an analog shut-off signal.

As FIG. 1 shows, the direct current voltage supply Ubatt supplies a PWM control PWM-St and a charging pump LP, as well as a series circuit of power semiconductor output stage T1 and a motor as inductive load M, which, for example, drives a blower. Depending on a predefinable setpoint value Soll, the PWM control PWM-ST controls the gate of the power semiconductor output stage T1 with pulse-width modulated signals controlled in timed operation. In the pauses of the control signals, the power semiconductor output stage T1 has high resistance and the shutoff voltage appearing across the motor is reduced in the freewheeling circuit, which is connected parallel to the motor, and a series circuit is composed of freewheeling diode D1 and additional reverse polarity protection semiconductor circuit T2. This reverse polarity semiconductor circuit T2 is made conductive by charging pump LP at least in the currentless sections of the power semiconductor output stage T1, so that the freewheeling current can flow. If control voltage Ubatt is applied with reverse polarity, then charging pump LP puts the reverse polarity protection semiconductor switch T2 into the non-conducting state so that the latter prevents an undesirable current flow via freewheeling diode D1. The protective circuits according to FIGS. 2 and 4 operate in the same way or about the same way so that in the case of the latter only the differences with respect to the protective circuit according to FIG. 1 are emphasized.

A buffer capacitor C1 is connected to the connecting point between reverse polarity protection semiconductor switch T2 and freewheeling diode D1, at which, in the case of a defective operation of the freewheeling circuit—that is, the charging pump LP or the reverse polarity protection semiconductor switch T2 is defective—the voltage can rise uncontrolled over a predefined operating value. The voltage across buffer capacitor C1 is reduced via a voltage divider composed of resistors R1 and R2 and is smoothed out again via a further capacitor C2. The voltage thus applied is supplied to an analog-to-digital converter in PWM control PWM-St, which, when a predefined voltage value is exceeded, which results in a non-functioning of the freewheeling circuit, delivers a digital shut-off signal for PWM control PWM-St. With this, the control of power semiconductor output stage T1 is interrupted, so that the further voltage rise across buffer capacitor C1 is terminated and all components of the circuit are protected against overloading and/or destruction.

Figure 2:
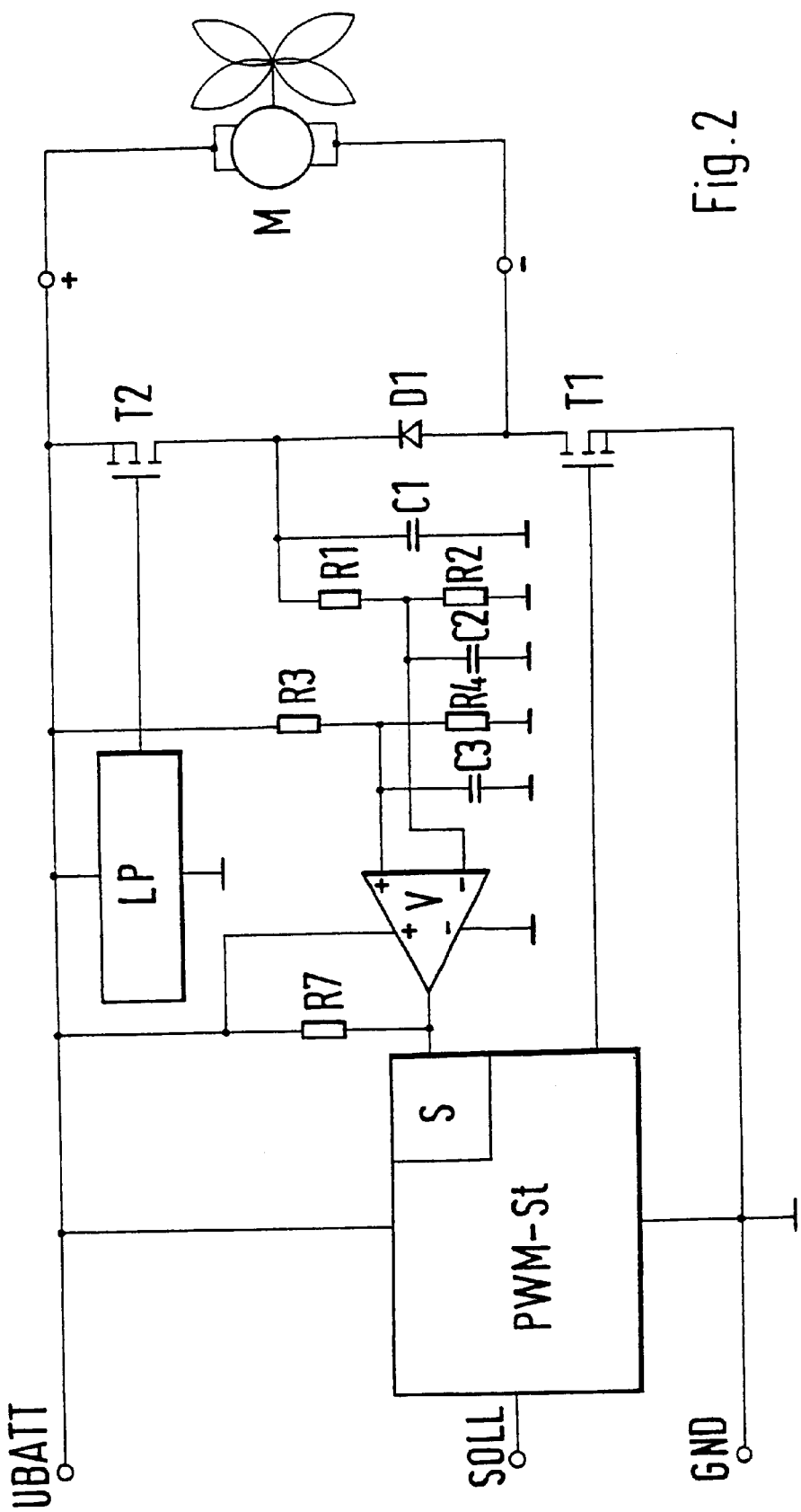
FIG. 2 shows a protective circuit with an arrangement for monitoring the voltage across the buffer capacitor and for comparing with the predefined reference voltage for deriving a digital shut-off signal.

In the case of the exemplary protective circuit according to FIG. 2, the reduced voltage across capacitor C2 is supplied to a comparator V, which compares it with a reference voltage picked up from resistors R3 and R4, and delivers a digital shut-off signal to a switch stage S of PWM control PWM-St when the voltage across capacitor C2 exceeds the reference voltage across the capacitor C3. Resistor R7 at the output of capacitor V is used for deriving the digital shut-off signal when the potential changes at the output of comparator V.

Figure 3:
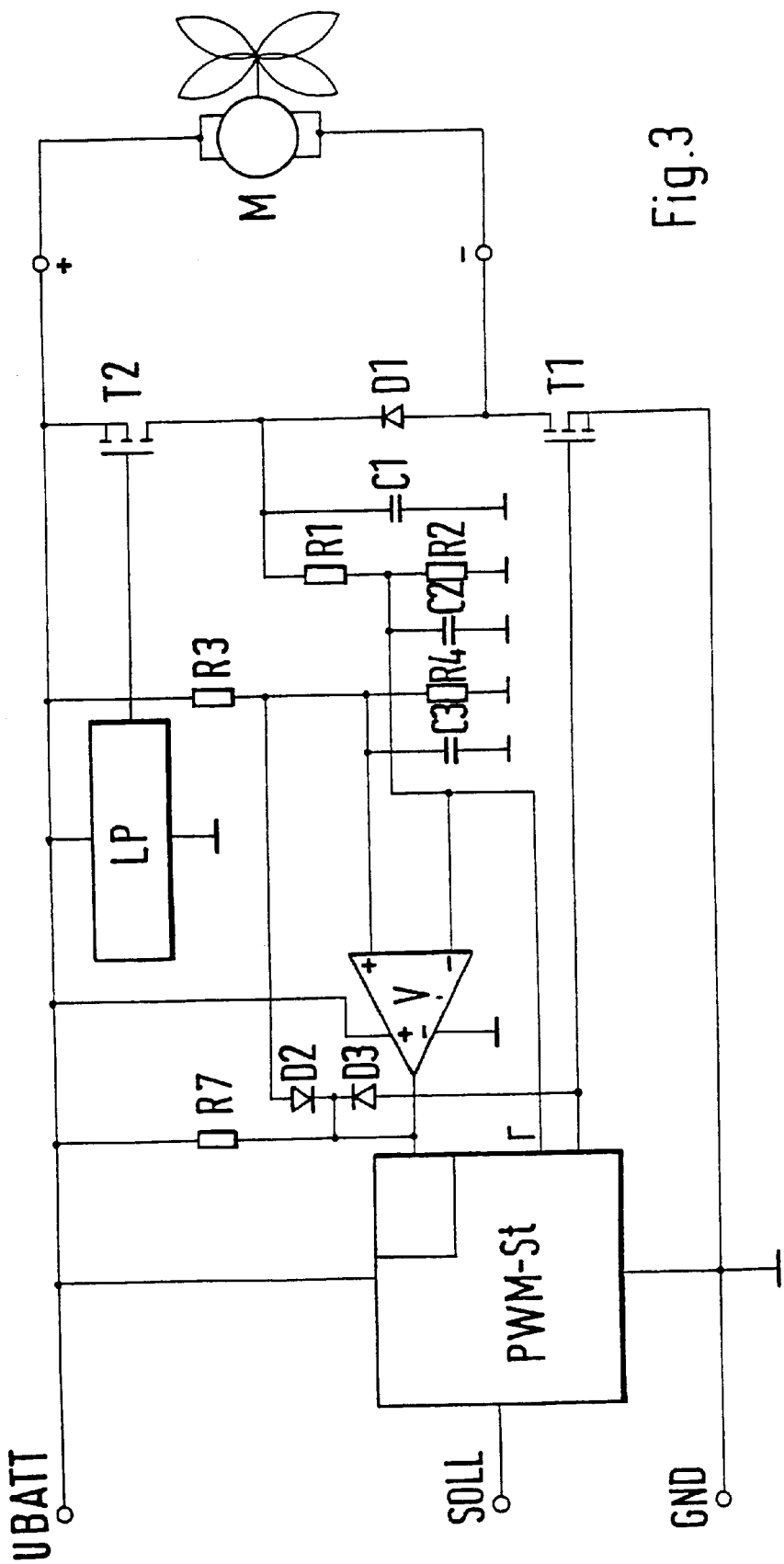
FIG. 3 shows a protective circuit like that of FIG. 3 with a locking circuit and a reset signal.

In the case of the exemplary embodiment according to FIG. 3, at the comparator V there is also an automatic circuit breaker, which has diodes D2 and D3, and is supplied by the voltage line and resistors R3 and R4. As soon as comparator V shifts into the state which indicates exceeding the reference voltage, the switch state of comparator V is maintained until a reset signal r is supplied to the comparator from PWM control PWM-St. This can take place after the defect in the entire circuit has been eliminated.

Figure 4:
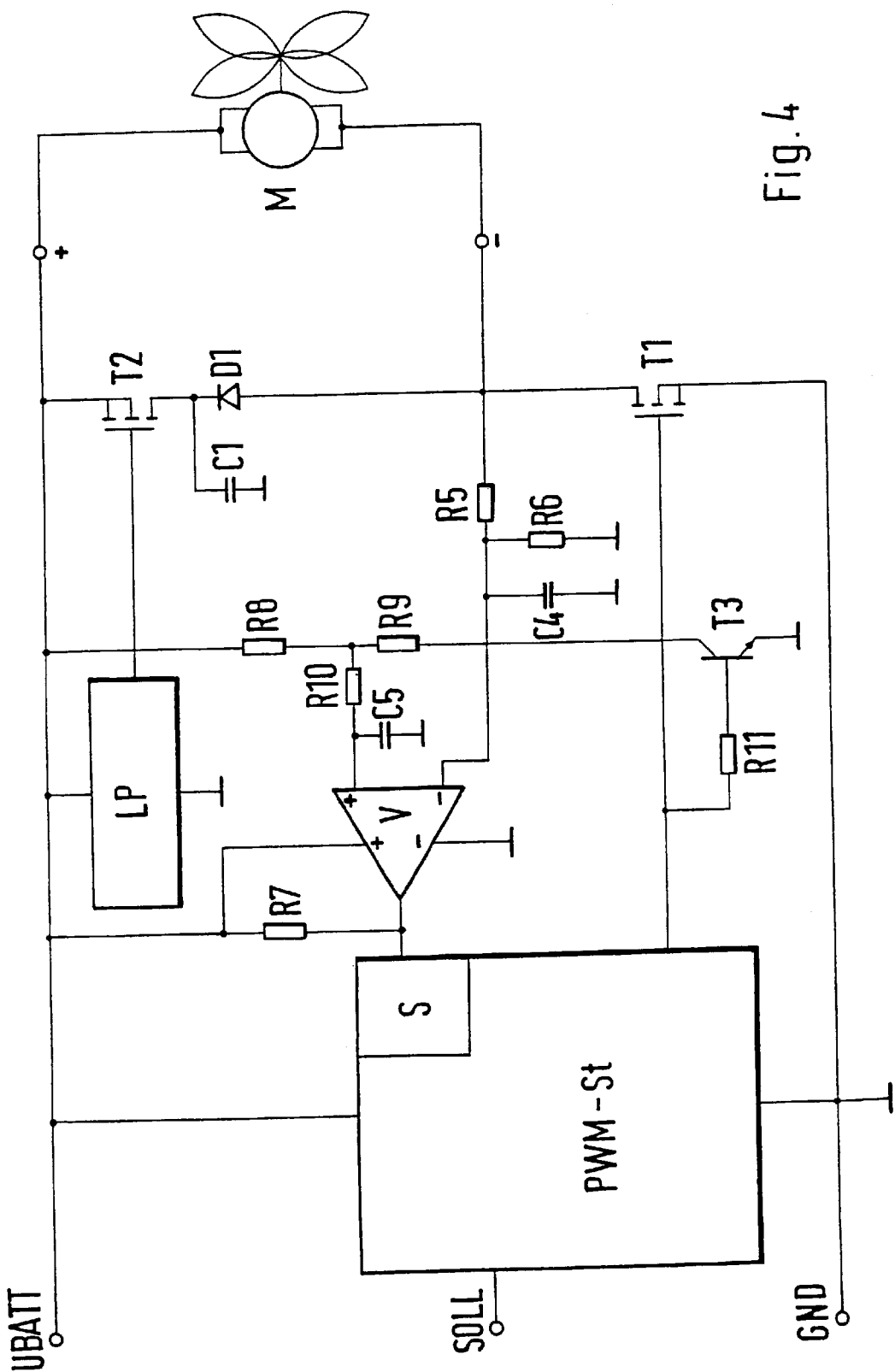
FIG. 4 shows a protective circuit with an arrangement for monitoring the drain-ground voltage across the power semiconductor output stage.

Finally, FIG. 4 shows an exemplary embodiment in which the drain-ground voltage of power semiconductor output stage T1 operated in the low side circuit is monitored as an N-channel MOS-FET. This voltage is tapped reduced on a voltage divider from resistors R5 and R6 and supplied to a capacitor C4. The voltage across capacitor C4 is supplied to comparator V, together with the reference voltage across capacitor CS, which is tapped on the voltage divider composed of resistors R8 and R9 and semiconductor switch T3. Semiconductor switch T3 is controlled by the PWM control signal of PWM control PWM-St via the resistor R11. The reference voltage is applied to capacitor C5 via resistor R/O. If the digital shut-off signal appears at the output of comparator V, then switch stage S in PWM control PWM-St interrupts the control of the power semiconductor output stage T1 and controls the reference voltage via semiconductor switch T3 so that comparator V no longer delivers a digital shut-off signal.

What is claimed is:

1. A protective circuit for a series circuit of a power semiconductor and an inductive load, an output stage of the power semiconductor being switchable on and off depending on a predefined setpoint value of a pulse-width modulated control signal, the protective circuit comprising:
   a charging pump;
   a freewheeling circuit connected in parallel to the inductive load, the free wheeling circuit including a freewheeling diode connected in series to a reverse polarity protection semiconductor switch, the reverse polarity protection semiconductor switch being made non-conducting via the charging pump when a supply voltage polarity is reversed; and
   an arrangement for monitoring a point in one of the freewheeling circuit and the series circuit for at least one of a voltage and a current indicating a fault in the freewheeling circuit, and for initiating a shut-off of a control of the output stage of the power semiconductor using the at least one of the voltage and the current indicating the fault.

2. The protective circuit of claim 1, wherein the output stage of the power semiconductor is controllable via a pulse-width modulated control, the pulse-width modulated control being switched off using the at least one of the voltage and the current.

3. The protective circuit of claim 2, wherein the pulse-width modulated control is switched off in a predefined time that is no greater than 10 ms after the fault appears.

4. The protective circuit of claim 1, further comprising a buffer capacitor connected to a connecting point between the freewheeling diode and the reverse polarity protection semiconductor switch, a capacitor voltage across the buffer capacitor rising over a predefined value to an increased voltage if the fault exists, the increased voltage being transferrable to the pulse-width modulated control as a shut-off signal.

5. The protective circuit of claim 4, further comprising an analog-to-digital converter, wherein the increased voltage across the buffer capacitor is transferrable to the pulse-width modulated control via as a digital shut-off signal.

6. The protective circuit of claim 5, further comprising a voltage divider, wherein the capacitor voltage across the buffer capacitor is reduceable via the voltage divider and is transferrable to the analog-to-digital converter.

7. The protective circuit of claim 4 further comprising a comparator, wherein one of the capacitor voltage across the buffer capacitor and a reduced voltage in the comparator is for comparing with a predefined reference voltage, the comparator routing a digital shut-off signal to the pulse-width modulated control when one of the capacitor voltage and the reduced voltage exceeds the predefined reference voltage.

8. The protective circuit of claim 7, wherein the comparator includes an automatic circuit breaker for maintaining a shut-off state, and a stable shut-off state of the comparator is cancelable by a reset signal supplied to the comparator from the pulse-width modulated control.

9. The protective circuit of claim 1, further comprising a comparator, wherein a drain-ground voltage of the output stage of the power semiconductor is monitored in a low side circuit, the drain-ground voltage being compared in the comparator with a predefined reference voltage, the comparator delivering a digital shut-off signal to the pulse-width modulated control when the drain-ground voltage exceeds the predefined reference voltage, a control of the output stage of the power semiconductor being interrupted and the reference voltage for the comparator being switched inactive with the digital shut-off signal.

10. The protective circuit of claim 1, wherein the arrangement for monitoring monitors a timed freewheeling current of the freewheeling circuit for the fault.

* * * * *